United States Patent
Tav et al.

(10) Patent No.: US 11,762,644 B2
(45) Date of Patent: Sep. 19, 2023

(54) AGENTLESS INSTALLATION FOR BUILDING DEPLOYMENTS

(71) Applicant: International Business Machines Corporation, Armonk, NY (US)

(72) Inventors: Doga Tav, Fredericton (CA); Matthew de Souza, Kanata (CA); Geoffrey Tate, Ottawa (CA); Nick Antonov, Fredericton (CA); Alpha Barry, Gatineau (CA)

(73) Assignee: International Business Machines Corporation, Armonk, NY (US)

( * ) Notice: Subject to any disclaimer, the term of this patent is extended or adjusted under 35 U.S.C. 154(b) by 235 days.

(21) Appl. No.: 17/316,405

(22) Filed: May 10, 2021

(65) Prior Publication Data
US 2022/0357937 A1    Nov. 10, 2022

(51) Int. Cl.
  *G06F 15/177*    (2006.01)
  *G06F 8/61*    (2018.01)
  (Continued)

(52) U.S. Cl.
  CPC .............. *G06F 8/61* (2013.01); *G06F 3/0619* (2013.01); *G06F 3/0644* (2013.01);
  (Continued)

(58) Field of Classification Search
  CPC ........ G06F 8/61; G06F 3/0619; G06F 3/0644; G06F 3/0673; G06F 9/4406;
  (Continued)

(56) References Cited

U.S. PATENT DOCUMENTS

| 7,519,711 B2 * | 4/2009 | Mohindra | H04L 67/61 709/226 |
| 7,631,038 B2 * | 12/2009 | Dickens | G06F 9/4416 709/219 |

(Continued)

FOREIGN PATENT DOCUMENTS

| CN | 105573776 A | * | 5/2016 |
| CN | 105573776 A | | 5/2016 |

(Continued)

OTHER PUBLICATIONS

PCT/CN2022/083748 International Search Report and Written Opinion, dated Jun. 22, 2022. 10 pages.

(Continued)

*Primary Examiner* — Volvick Derose
(74) *Attorney, Agent, or Firm* — Donald J. O'Brien (57) ABSTRACT

A method, a computer program product, and a system for server provisioning and deployment. The method includes receiving a deployment configuration for a server. The deployment configuration includes a requested software build and a requested installation of an application and configuration for the server. The method also includes reconfiguring hardware on the server based on the deployment configuration and via an out-of-band management card on the server and pushing a boot loader on to the server for installation of an operating system. The method further includes performing an installation of the operating system on the server, transmitting an auto configuration file to the server. The auto configuration file provides installation properties relating to the application. The method also includes monitoring a status of the server during the installation of the application using a serial terminal output on the server.

20 Claims, 6 Drawing Sheets

(51) Int. Cl.
*G06F 9/4401* (2018.01)
*G06F 15/78* (2006.01)
*H04L 9/40* (2022.01)
*G06F 3/06* (2006.01)
*G06F 11/30* (2006.01)
*G06F 11/34* (2006.01)
*H04L 61/5014* (2022.01)

(52) U.S. Cl.
CPC .......... *G06F 3/0673* (2013.01); *G06F 9/4406* (2013.01); *G06F 9/4416* (2013.01); *G06F 11/302* (2013.01); *G06F 11/3495* (2013.01); *G06F 15/7882* (2013.01); *H04L 61/5014* (2022.05); *H04L 63/029* (2013.01); *G06F 9/4401* (2013.01)

(58) Field of Classification Search
CPC .. G06F 9/4416; G06F 11/302; G06F 11/3495; G06F 15/7882; H04L 61/5014; H04L 63/029
USPC .............................................................. 713/2
See application file for complete search history.

(56) References Cited

U.S. PATENT DOCUMENTS

| | | | |
|---|---|---|---|
| 8,677,317 | B2 | 3/2014 | Arnold |
| 8,832,434 | B2 | 9/2014 | Apostolopoulos |
| 9,189,285 | B2 | 11/2015 | Ng |
| 9,881,181 | B2 | 1/2018 | Akiyama |
| 11,323,325 | B1* | 5/2022 | Hullahalli ........... H04L 41/0883 |
| 11,580,153 | B1* | 2/2023 | Liao ...................... G06F 16/951 |
| 2003/0105830 | A1 | 6/2003 | Pham |
| 2004/0177352 | A1 | 9/2004 | Narayanaswamy |
| 2005/0132360 | A1* | 6/2005 | Chu .................... H04L 61/5007 717/177 |
| 2005/0216911 | A1* | 9/2005 | Yen .......................... G06F 8/60 717/176 |
| 2006/0075079 | A1 | 4/2006 | Powers |
| 2007/0157017 | A1* | 7/2007 | Barron .................. G06F 9/4416 713/2 |
| 2007/0294405 | A1* | 12/2007 | Mohindra ............... H04L 67/51 709/226 |
| 2010/0043006 | A1* | 2/2010 | Oakes ................. G06F 9/44505 718/104 |
| 2011/0035740 | A1* | 2/2011 | Powell .................... G06F 8/656 717/170 |
| 2013/0205293 | A1* | 8/2013 | Levijarvi .............. G06F 9/5027 717/177 |
| 2013/0318520 | A1* | 11/2013 | Abuelsaad .......... G06F 9/44505 717/177 |
| 2016/0014073 | A1* | 1/2016 | Reddy ..................... H04L 43/16 713/2 |
| 2017/0003951 | A1* | 1/2017 | Newell ................ G06F 9/45558 |
| 2017/0344354 | A1* | 11/2017 | Schiefelbein ............. G06F 8/61 |
| 2018/0359244 | A1* | 12/2018 | Cockerill ............ H04L 63/0823 |
| 2020/0285752 | A1* | 9/2020 | Wyatt ..................... G06F 21/53 |
| 2020/0285761 | A1* | 9/2020 | Buck ..................... G06F 21/604 |
| 2021/0271523 | A1* | 9/2021 | Parthasarathy ........ G06F 9/5077 |
| 2023/0004369 | A1* | 1/2023 | Brooks ................. G06F 16/972 |
| 2023/0008885 | A1* | 1/2023 | Khatri .................. G06F 21/575 |
| 2023/0044016 | A1* | 2/2023 | Harper ...................... G06F 8/65 |

FOREIGN PATENT DOCUMENTS

| | | | |
|---|---|---|---|
| CN | 105791362 A | | 7/2016 |
| CN | 106708515 A | * | 5/2017 |
| CN | 106708515 A | | 5/2017 |
| CN | 111371589 A | | 7/2020 |

OTHER PUBLICATIONS

"VideoEdge Hardening Guide," v1, VideoEdge v5.3, Nov. 30, 2018, Johnson Control, https://www.johnsoncontrols.com/-/media/jci/cyber-solutions/documents/security-products/amercian-dynamics/videoedge-v53-hardening-guide.pdf.

Brikman, Yevgeniy, Why we use Terraform and not Chef, Puppet, Ansible, Saltstack, or CloudFormation, Sep. 26, 2016, https://blog.gruntwork.io/why-we-use-terraform-and-not-chef-puppet-ansible-saltstack-or-cloudformation-7989dad2865c.

Configure Remote Monitoring Using Secure Shell (SSH), https://docs.microfocus.com/itom/SiteScope:11.41/Use/SSH_mon.

IBM Security Identity Manager Version 6.0 Installation Guide, https://www.ibm.com/support/knowledgecenter/SSRMWJ_6.0.0/com.ibm.isim.doc_6.0/isim60_Install_Guide.pdf.

OS Installation, Using Lenovo XClarity Provisioning Manager, https://sysmgt.lenovofiles.com/help/index.jsp?topic=%2FLXPM%2Fos_installation.html.

The Benefits of Agentless Architecture, Red Hat Ansible, Automation, https://www.ansible.com/hubfs/pdfs/Benefits-of-Agentless-WhitePaper.pdf.

Well et al., "The NIST Definition of Cloud Computing," Recommendations of the National Institute of Standards and Technology, U.S. Department of Commerce, Special Publication 800-145, Sep. 2011, 7 pgs.

\* cited by examiner

AGENTLESS INSTALLATION FOR BUILDING DEPLOYMENTS

BACKGROUND

The present disclosure relates to server provisioning and deployment, and more specifically, to an agentless and portable provisioner that can automate deployments for secure and scalable workflows.

Server provisioning provides a set of actions to prepare a server with appropriate systems, data, and software, and make it ready for network operation. During the server provisioning process, a server is selected and loaded with the appropriate software. The software includes an operating system, device drivers, middleware, and applications. Additionally, provisioning the server can change additional parameters such as an internet protocol (IP) address and an IP gateway to allow the server to find the associated network and storage system resources.

In the past, server provisioning was handled manually, including setting up a server, configuring the hardware to the desired settings, and installing any necessary applications. Manual provisioning, however, can be time-consuming and prone to human error. Alternatively, automated provisioning can now be performed using configuration files that detail the required specifications for a server. The automated process can be performed on traditional physical servers as well as on virtual infrastructure.

SUMMARY

Embodiments of the present disclosure include a computer-implemented method of server provisioning and deployment, and more specifically, to an agentless and portable provisioner that can automate deployments for secure and scalable workflows. The computer-implemented method includes receiving a deployment configuration for a server. The deployment configuration includes a requested software build and a requested installation of an application and configuration for the server. The computer-implemented method also includes reconfiguring hardware on the server based on the deployment configuration and via an out-of-band management card on the server and pushing a boot loader on to the server for installation of an operating system. The computer-implemented method further includes performing an installation of the operating system on the server, transmitting an auto configuration file to the server. The auto configuration file provides installation properties relating to the application. The computer-implemented method also includes monitoring a status of the server during the installation of the application using a serial terminal output on the server.

Additional embodiments of the present disclosure include a computer program product of server provisioning and deployment, and more specifically, to an agentless and portable provisioner that can automate deployments for secure and scalable workflows, one or more computer-readable storage medium, and program instructions stored on the one or more computer-readable storage media, the program instruction executable by a processor to cause the processor to perform a method. The method receiving a deployment configuration for a server. The deployment configuration includes a requested software build and a requested installation of an application and configuration for the server. The method also includes reconfiguring hardware on the server based on the deployment configuration and via an out-of-band management card on the server and pushing a boot loader on to the server for installation of an operating system. The method further includes performing an installation of the operating system on the server, transmitting an auto configuration file to the server. The auto configuration file provides installation properties relating to the application. The method also includes monitoring a status of the server during the installation of the application using a serial terminal output on the server.

Further embodiments of the present disclosure include a system of server provisioning and deployment, and more specifically, to an agentless and portable provisioner that can automate deployments for secure and scalable workflows. The system includes a memory, a processor, local data storage having stored thereon computer-executable code. The computer-executable code includes the program instruction executable by a processor to cause the processor to perform the method described above. Additionally, the system includes a translator configured to translate vendor-specific commands to translate the commands in their stack during the method described above. This allows the system to provide a simple set of common commands that do not rely on a specific vendor and can operate in a mixed hardware environment. The present summary is not intended to illustrate each aspect of, every implementation of, and/or every embodiment of the present disclosure.

BRIEF DESCRIPTION OF THE DRAWINGS

These and other features, aspects, and advantages of the embodiments of the disclosure will become better understood with regard to the following description, appended claims, and accompanying drawings where:

While the present disclosure is amenable to various modifications and alternative forms, specifics thereof have been shown by way of example in the drawings and will be described in detail. It should be understood, however, that the intention is not to limit the particular embodiments described. On the contrary, the intention is to cover all modifications, equivalents, and alternatives falling within the scope of the present disclosure. Like reference numerals are used to designate like parts in the accompanying drawings.

DETAILED DESCRIPTION

The present disclosure relates to server provisioning and deployment, and more specifically, to an agentless and portable provisioner that can automate deployments for secure and scalable workflows. While the present disclosure is not necessarily limited to such applications, various aspects of the disclosure may be appreciated through a discussion of various examples using this context.

Data centers are facilities that physically house various equipment, such as computers, servers (e.g., web servers, application servers, database servers), switches, routers, data storage devices, load balancers, wire cages or closets, vaults, racks, and related equipment for the purpose of storing, managing, processing, and exchanging data and information between hosts. A host typically corresponds to a computer system, a process with associated physical memory, or a processor with shared memory and/or resources. Data centers also provide application services and management for various data processing functions, such as web hosting, Internet, intranet, telecommunications, and information technology.

Data centers are typically within a controlled and well-monitored environment. These data centers are managed by one or more administrators. In order to provide the application services, the software is installed by an administrator on each host of the data center. Typically, installing software on each host is performed remotely via provisioning. Server provisioning provides a set of actions to prepare a server with appropriate systems, data, and software to make it ready for network operation. During the server provisioning process, a server is selected and loaded with the appropriate software. The software includes an operating system, device drivers, middleware, and applications. Additionally, provisioning the server can change additional parameters such as an IP address and an IP gateway to allow the server to find associated network and storage system resources.

Provisioning also requires adaptability as data centers are typically large and heterogeneous with respect to different operating systems (e.g., Solaris developed by Sun Microsystems, Inc. (a trademark of Sun Microsystems, Inc. located in Santa Clara, Calif.), Red Hat Linux® developed by Red Hat, Inc. (a registered trademark of Red Hat, Inc. located in Raleigh, N.C.), SUSE® Linux developed by Novell, Inc. (a registered trademark of Novell, Inc. located in Waltham, Mass.), Windows® developed by Microsoft Corporation (a registered trademark of the Microsoft Corporation located in Redmond, Wash.), etc.) and types of hosts (i.e., different hosts use different hardware).

Depending on the operating system, a separate provisioning program may be used that can orchestrate the provisioning of the operating system on the host. Each provisioning program can also have different input parameters, configuration file formats, and configuration steps.

Limitations on server provisioning and deployment remain, however, as current provisioning solutions may require manual hardware configuration or booting, no monitored feedback, require media access control (MAC) addressed to be specified, require manual system configuration, be vendor-specific, or limited to certain operating systems. Furthermore, data centers prioritize the high availability of their services as well as providing prompt disaster recovery services. Deploying new nodes quickly can be crucial to software deployments that are focused on data processing. Not all software, however, can be deployed and executed in a container in a secure and scalable manner. This can be due to design, modus operandi, technical debt, supportability, and the like.

Embodiments of the present disclosure may overcome the above, and other problems, by using an agentless provisioner for server provisioning and workload deployment. The agentless provisioner can perform a customized method that can execute scalable workflows and allow users to define their desired deployment by profiling the processing node types and details. Installation and configuration of the software can be automated and scalable. Thus, embodiments can provide users with lesser downtime by not having to maintain other deployments.

More specifically, the agentless provisioner transmits a request message to a management interface on a destination server to initiate the provisioning and deployment of the software on the destination server. The request message can include a requested software build and a requested installation configuration. The agentless provisioner can then reconfigure the hardware of the destination server via the management interface. The reconfiguration can include configuring a Redundant Array of Independent Disks (RAID), providing firmware properties, configuring boot options, and triggering the boot to apply the changes made in the reconfiguration. Once configured, the agentless provisioner pushes a bootloader onto the destination server that can then begin the installation of an operating system.

The agentless provisioner can also provide an auto-configuration file to the destination server. The auto-configuration file can provide installation properties relating to the application being installed. During the installation, the agentless provisioner can monitor the installation via a serial terminal output. The information outputted by the serial terminal can be parsed, and the agentless provisioner can determine whether or not any additional steps need to be taken in order for the application to install successfully. The communication relayed from the server is intercepted by the agentless provisioner and translated based on the type of communication. By doing so, the installation and monitoring process can be vendor-agnostic as the agentless provisioner can translate communication via a translation component.

Additionally, the agentless provisioner can actively push installations to destination servers. In order to determine that the correct destination server is being acted upon, the agentless provisioner can use a provisioning profile. The provisioning profile can map and assign universally unique identifiers (UUID) to the servers based on their MAC address, IP address, host, and management interface. The contents of a disc image, or ISO, containing the installation software, or other packing mechanism, can act as an internal repository that is loaded onto the random-access memory (RAM) of the destination server. The RAM installation avoids disk or network slowdowns that may otherwise occur if the installations were performed via a disk or network. Also, by loading the contents onto the RAM, the agentless provisioner can serve multiple requests as well as track the progress of simultaneous installations.

In order to facilitate installations from memory, a Trivial File Transfer Protocol (TFTP) server can enable the agentless provisioner to push the required packages to the destination server in increments based on the memory available on the destination server. For example, if the destination server has eight gigabytes of memory available, then the agentless provisioner can push increments of the package equal to or less than the eight gigabytes of memory, thereby allowing the installation to occur off of the memory.

In some embodiments, the agentless provisioner reconfigures hardware on the destination server via an out-of-band management card connected to the destination server. The reconfiguration can include configuring a RAID, providing firmware properties, configuring boot options, and triggering the boot to apply the changes made in the reconfiguration. For example, the application is installed on the destination may require certain firmware and/or RAID configuration. The agentless provisioner can match the necessary requirements needed by the application and reconfigure the hardware on the destination server to ensure the application installs correctly. Additionally, the agentless provisioner can ensure Preboot eXecution Environment (PXE) boot settings are functioning correctly on at least one available network interface card (NIC) installed on the destination server. PXE booting allows the destination to be booted by the agentless provisioner via a network. Once the hardware is reconfigured, and the PXE boot settings are set, then the agentless provisioner can power cycle the destination server to apply all of the reconfiguration settings that were made. The agentless provisioner can provide the destination server and ensure that communication from the destination server uses the correct MAC address and the provided IP address.

In some embodiments, the bootloader that is pushed is an open-source implementation of the preboot execution environment (IPXE) client firmware and bootloader. The IPXE bootloader provides support to boot from the destination server from the network or to extend existing PXE client implementation on the destination server, so it supports additional protocols. The agentless provisioner can generate a boot loader configuration file that includes install options and a source software version of the bootloader. Once the bootloader is booted, the agentless provisioner can proceed to install an operating system on the destination server.

Figure 1:
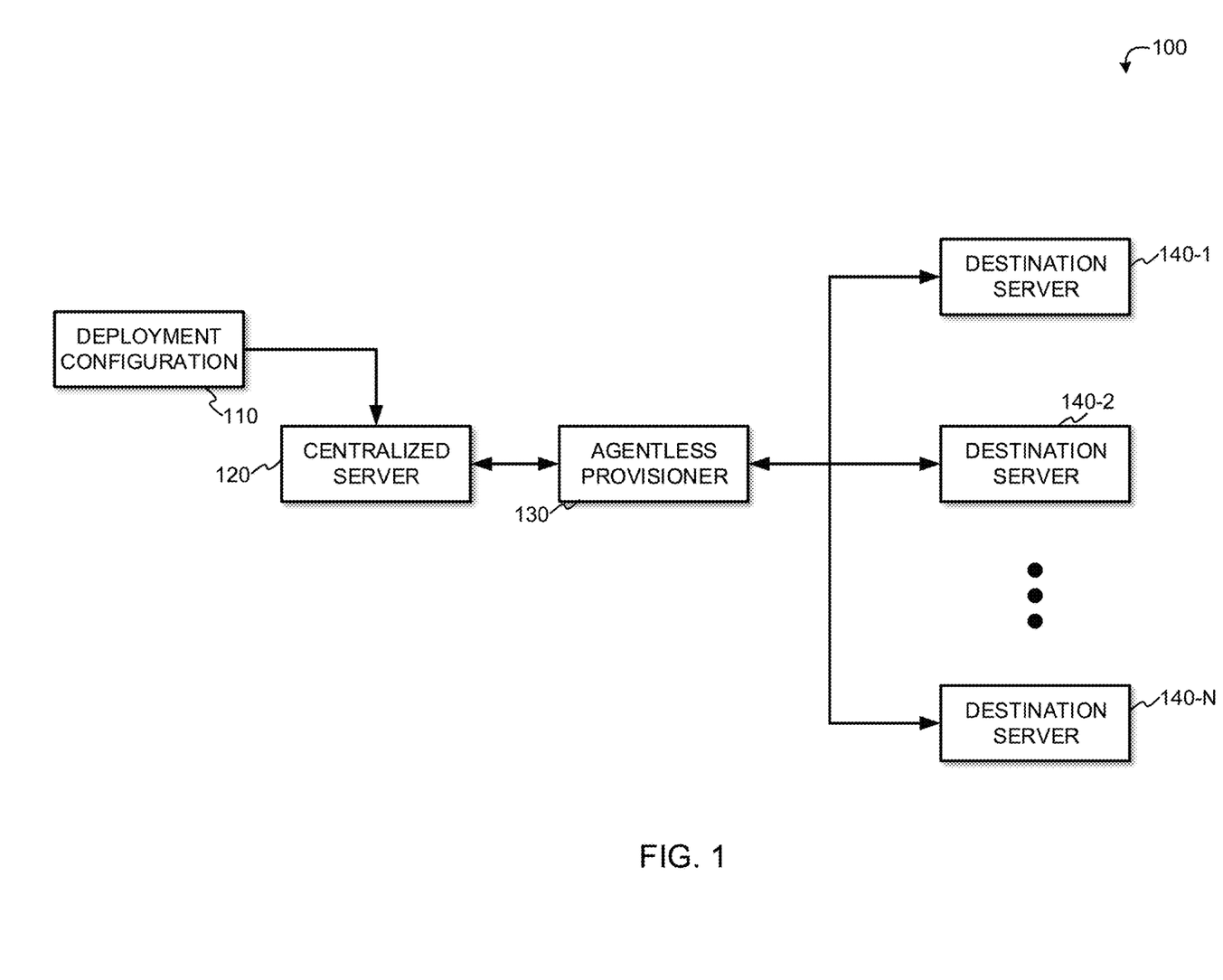
FIG. 1 is a block diagram illustrating an overall solution architecture used by one or more embodiments of the present disclosure.

Referring now to FIG. 1, shown is a high-level block diagram of overall solution architecture 100, in accordance with embodiments of the present disclosure. The architecture 100 includes a deployment configuration 110, a centralized server 120, an agentless provisioner 130, and destination server 140-1, 140-2, 140-N (collectively "destination servers 140") where N is a variable integer representing any number of possible destination servers 140. Additional details of the agentless provisioner 130 are presented in FIG. 2.

The deployment configuration 110 is a component of the architecture 100 that includes commands to run specific instructions for booting (e.g., tempf, etc.) from a specific source to facilitate deployment of an application onto a destination server 140-1. The deployment configuration 110 can build and extend the deployment the destination servers 140 specified in the deployment configuration. For example, the deployment configuration 110 can specify which destination servers 140 in a data center the application should be installed with. Additionally, the deployment configuration can include vendor-specific credentials that the agentless provisioner 130 can utilize to communicate with the destination servers 140 via a secure shell protocol (SSH) tunnel. For example, the vendor-specific credentials can be used to set up the SSH tunnel via an Integrated Dell Remote Access Controller (iDRAC) or an Integrated Management Module (IMM).

The centralized server 120 is a component of the architecture 100 configured to correspond as a unit for providing an interface to an administrator (not shown). In some embodiments, the centralized server 120 is a web server that includes various forms of functionality. The functionality includes, for example, the ability to issue web pages or web applications to the administrator, providing an application executing on a computer of the administrator, or any other functionality which provides an interface to the system. The interface may be a command line interface or a graphical user interface.

The agentless provisioner 130 is a component of the architecture 100 configured to manage the provisioning of the destination server 140. In some embodiments, the agentless provisioner 130 corresponds to one or more servers connected to the destination servers 140. The agentless provisioner 130 is described in greater detail below (in FIG. 2).

The destination servers 140 are components of the architecture 100 corresponding to a group of servers on which the provisioning may be performed. Typically, multiple different operating systems are provisioned on the destination servers 140. For example, destination server 140-1 and destination server 140-2 execute two different types of operating systems. In some embodiments, different groupings between the destination servers 140 may execute the same operating system and may or may not use the same configuration settings. For example, destination server 140-1 and destination server 140-2 execute the same operating system but utilize different configuration settings based on various settings and hardware of each server.

The destination servers 140 can include multiple controllers such as a serial terminal controller, a power controller, a boot controller, a graphical console controller, a device discovery controller, and the like. These controllers can provide for remote management of the destination servers 140 by the agentless provisioner 130. For example, the serial terminal controller includes functionality to allow for remote viewing of the output of a serial terminal. The power controller includes functionality for turning on and off the destination server 140. The boot controller includes functionality to allow for remote loading of programs. The graphical console controller includes functionality to allow for remote viewing of a graphical console. The device discovery controller includes functionality to allow for remote adding and configuring new devices on the destination server 140.

It should be understood that there are multiple types of controllers (e.g., serial terminal controller, power controller, boot controller, graphical console controller, device discovery controller). Additionally, one or more of the aforementioned functionalities provided by the different controllers may be performed by a single controller or a different controller. For example, the Automatic Light Out Management (ALOM) controller performs the functions of a power controller, a boot controller, and a serial terminal controller.

In some embodiments, the destination servers 140 are composed of heterogeneous hardware systems. For example, destination server 140-1 may correspond to a server managed through Sun Microsystems, Inc. Intelligent Platform Management Interface (IPMI) and destination server 140-2 may correspond to a server managed through Dell Inc. Integrated Dell Remote Access Controller (iDRAC), etc. Alternatively, the destination servers 140 may be of a generic type in which the hardware is individually specified by an administrator.

The destination server 140, the agentless provisioner 130, and the centralized server 120 may be connected in virtually any manner. Further, in some embodiments, the agentless provisioner 130 and the destination server 140 are behind a firewall. The centralized server 120 may or may not be behind the same firewall as the agentless provisioner 130 and the destination server 140. Typically, the agentless provisioner 130 is maintained with or without the centralized server 120 at a data center that maintains the destination servers 140.

It is noted that FIG. 1 is intended to depict the major representative components of an exemplary architecture 100. In some embodiments, however, individual components may have greater or lesser complexity than as represented in FIG. 1, components other than or in addition to those shown in FIG. 1 may be present, and the number, type, and configuration of such components may vary.

Figure 2:
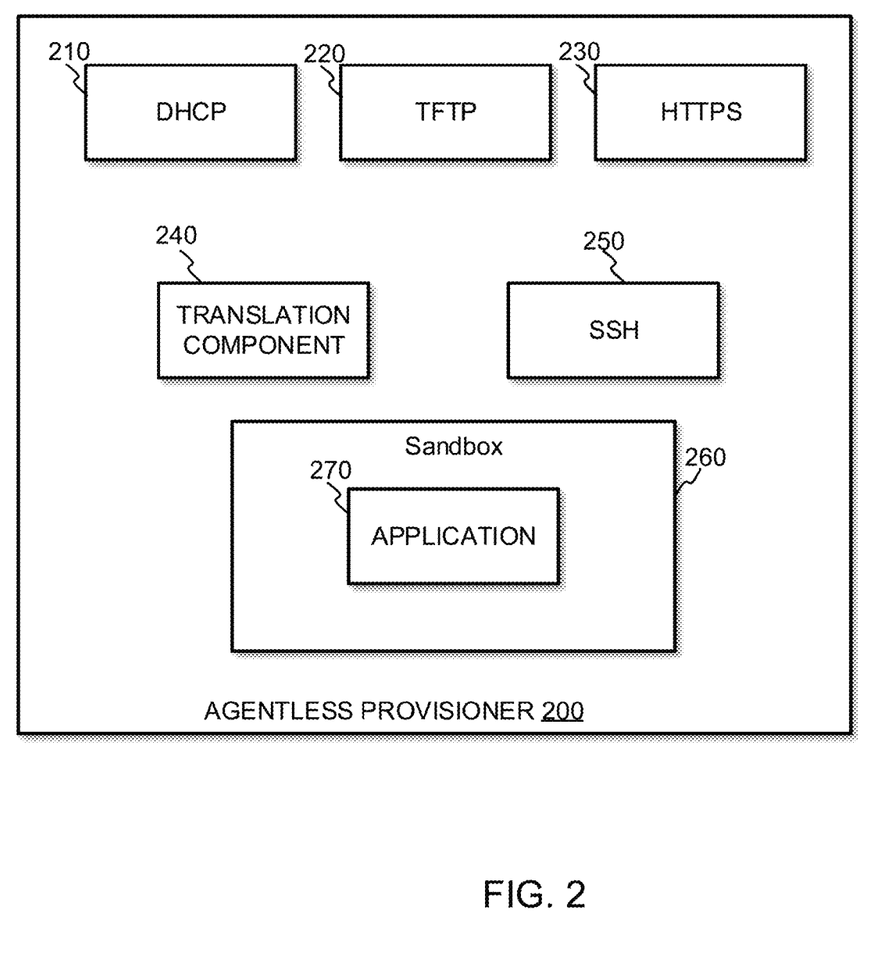
FIG. 2 is a block diagram illustrating an agentless provisioner used by one or more embodiments of the present disclosure.

With reference now to FIG. 2, an exemplary agentless provisioner 200 (analogous to the agentless provisioner 130 in FIG. 1) is presented. The agentless provisioner 200 includes a dynamic host configuration protocol (DHCP) server 210, a trivial file transfer protocol (TFTP) server 220, a hypertext transfer protocol secure (HTTPS) server 230, a translation component 240, a secure socket shell (SSH) service 250, a sandbox 260, and an application 270. The agentless provisioner 200 can provision heterogeneous destination servers 140 with a server-specific operating system and application as specified in a deployment configuration 110.

The DHCP server 210 is a component of the agentless provisioner 200 configured to provide a network management protocol used on Internet Protocol (IP) local area networks. The DHCP server can provide IP addresses to the destination servers 140 using the DHCP protocol. Additionally, the DHCP server 210 can assign a unique address to each of the destination servers 140, identifying them for transmission control protocol (TCP)/IP communication, and supplies other network configuration parameters. The DHCP server 210 can operate a DHCP service that can provide the minimal DHCP requirements for provisioning using the various DHCP configurations required for different operating systems running on the destination servers 140.

The TFTP server 220 is a component of the agentless provisioner 200 configured to store and provide files (e.g., the application, operating system, etc.) for provisioning. The TFTP server 220 can also be used to transfer firmware images and configuration files to the destination servers 140.

The HTTPS server 230 is a component of the agentless provisioner 200 configured for providing secure communication between the agentless provisioner 200 and the destination servers 140. In HTTPS, the communication protocol is encrypted using Transport Layer Security (TLS) or Secure Socket Layer (SSL). The HTTPS server 230 provides for bidirectional encryption of communications between the agentless provisioner 20 and the destination server 140, protecting the communication against eavesdropping and tampering.

The translation component 240 is a component of the agentless provisioner 200 configured to translate vendor-specific commands provided by the destination servers 140. For example, destination server 140-1 may be a Dell server with a unique set of configuration commands, while destination server 140-2 may be a Hewlett-Packard server with another unique set of configuration commands. During the provisioning process, the destination servers 140 can receive and transmit the unique set of commands to and from the agentless provisioner 200. These commands, for example, can provide commands, updates, and status notifications during the provisioning process. The translation component 240 can automatically translate the vendor-specific commands to allow the agentless provisioner 200 to scale across an environment with heterogeneous destination servers 140.

Additionally, the translation component 240 provides translations for a sequence of commands or actions that are executed against management controllers (e.g., family/model) of the destination servers 140 to accomplish a task (e.g., network booting, reboot, etc.). In some embodiments, the translation component 240 translates error codes during error handling. The translations can be for common issues that may exist with a destination server 140 during the provisioning process. The error code translations can ensure that the tasks being performed on the destination servers 140 completely properly even when an error arises at the management controller level. Additionally, the translation component 240 can adjust commands based on preferences relating to command line syntax, expected responses, timing, and the like.

In some embodiments, the translation component 240 translates the vendor-specific commands via a mapping between vendor-specific commands and commands understandable by the agentless provisioner 200. This can be accomplished by an administrator mapping the commands from the destination servers 140 manual to the commands offered by the agentless provisioner 200. The translation component 240 thus provides a simple set of common commands that are not vendor-specific, thereby allowing for a mixed hardware deployment that can be deployed harmoniously.

The SSH service 250 is a component of the agentless provisioner 200 configured to provide secure shell tunneling between the agentless provisioner 200 and the destination servers 140 during the provisioning process. The SSH tunnel can be used to transfer unencrypted traffic over a network through an encrypted channel.

The sandbox 260 is a component of the agentless provisioner 200 configured as a security mechanism for separating running programs. The agentless provisioner 200 can observe and analyze the application 270 in the isolated environment. The sandbox 260 can prevent threats from getting on the network and potentially altering the application.

The agentless provisioner 200 is configured to work with manufacturer's management interfaces such as iDRAC and IMM. This allows the agentless provisioner 200 to communicate with the destination servers 140 via a SSH tunnel for secure connection and can avoid using other interfaces such as Intelligent Platform Management Interface ("IPMI") that does not provide for secure communication.

The agentless provisioner 200 is further configured to monitor installation progress of the operating system and application installations during the provisioning process. The agentless provisioner can monitor the out-of-band serial terminals and/or SSH connections to ensure that the installations are occurring correctly. This can be performed by analyzing logs, parsing regular expression files, and intercepting output produced by the serial terminals.

In some embodiments, the agentless provisioner 200 is portable and self-contained. For example, the agentless provisioner 200 can be a deployable binary including a bash and java program distributable to multiple destination servers 140. Scalability can be achieved by loading the ISO contents to random-access memory of the destination servers 140, thereby enabling the mechanism to be able to serve multiple requests.

It is noted that FIG. 2 is intended to depict the major representative components of an exemplary agentless provisioner 200. In some embodiments, however, individual components may have greater or lesser complexity than as represented in FIG. 2, components other than or in addition to those shown in FIG. 2 may be present, and the number, type, and configuration of such components may vary.

Figure 3:
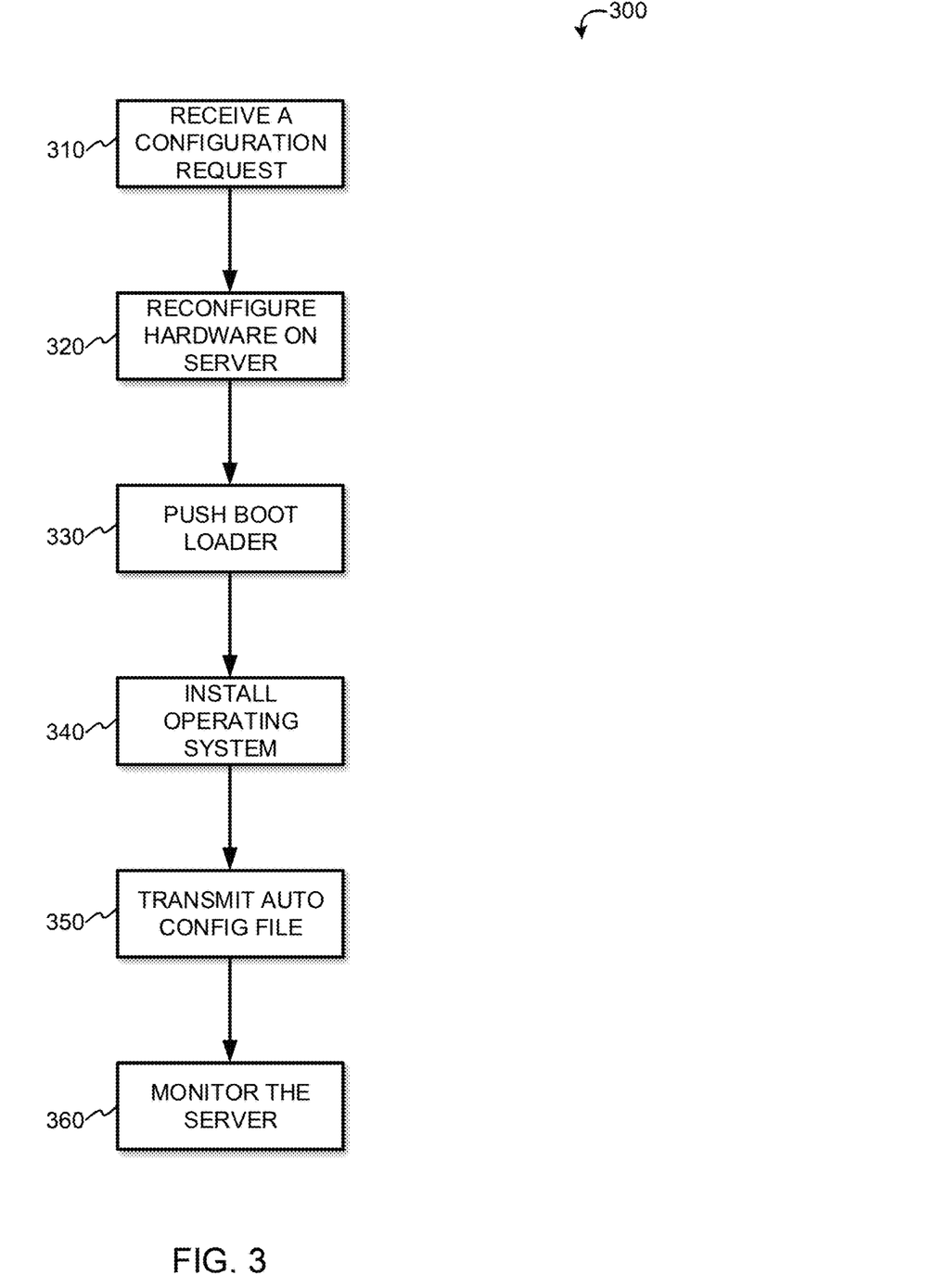
FIG. 3 is a flow diagram illustrating a process of server provisioning using an agentless provisioner on a server and performed in accordance with embodiments of the present disclosure.

FIG. 3 is a flow diagram illustrating a process 300 of a server provisioning process using an agentless provisioner, in accordance with embodiments of the present disclosure. The process 300 may be performed by hardware, firmware, software executing on a processor, or a combination thereof.

For example, any or all the steps of the process 300 may be performed by one or more processors embedded in a computing device.

A deployment configuration request is received for a destination server 140. This is illustrated at step 310. For example, an administrator generates and transmits the deployment configuration 110 to the agentless provisioner 200. The deployment configuration 110 can include an intended configuration and installation instructions. For example, the deployment configuration 110 can include a requested software build and a requested installation configuration for an application to be installed. In some embodiments, the administrator transmits the deployment configuration 110 to the agentless provisioner 200 via a representational state transfer (REST) call. The administrator can also transmit the deployment configuration 110 to a centralized server 120 running the agentless provisioner 200, which then transmits the deployment configuration 110 to the provisioner 130.

The hardware on the destination server 140 is reconfigured based on the information provided in deployment configuration 110. This is illustrated at step 320. In some embodiments, the agentless provisioner 200 can configure the destination server 140 via an out-of-band terminal on the destination server 140 for preboot execution environment (PXE) booting on at least one available network interface card (NIC) connected to the destination server 140. The agentless provisioner 200 can then synchronize a terminal speed on the destination server 140 based on the speed offered by the operating system being installed. For example, getting COM2 in a specific baud rate so the agentless provisioner 200 and the destination server 140 can communicate at the same speed.

Once synced, the agentless provisioner 200 can utilize a controller to reboot the destination server 140 to complete the configuration of the hardware specified in the deployment configuration 110. In some embodiments, all NICs connected to the destination server 140 are set for network booting prior to rebooting. The first network card that becomes operational is selected for communication. The agentless provisioner 200 can ensure known working settings for Preboot eXecution Environment PXE booting are available on all available NICs once the hardware on the destination server 140 is reconfigured. Additionally, the agentless provisioner 200 can ensure the serial terminal on the destination server 140 is configured correctly to a known state. Once verified, the agentless provisioner 200 can power cycle the destination server 140, thereby rebooting the system.

Once rebooted, the agentless provisioner 200 can receive a DHCP offer packet from the destination server 140 and provide the destination server 140 with an IP address. In some embodiments, the destination server 140, via a NIC, can send out a DHCP offer packet to the broadcast domain. The agentless provisioner 200 can intercept the packet and inspect the destination server 140 and its architecture. The agentless provisioner 200 can respond to the destination server 140 with an IP address for the machine. Also, the agentless provisioner 200 can notate the media access control (MAC) address relating to the destination server 140.

The agentless provisioner 200 pushes a bootloader onto the destination server 140. This is illustrated at step 330. In some embodiments, the bootloader is a modified version of a PXE client firmware and bootloader. Once pushed, the bootloader will execute and begin running on the destination server 140.

In some embodiments, pushing the boot loader includes generating a boot loader configuration file. The boot loader configuration file can include options and a source software version of the boot loader. Based on the deployment configuration 110, the boot loader configuration file can include installation options and the source software version for the application being installed (e.g., QRadar). The source ISO file for the boot loader configuration file is not mounted or unpacked to the file system. It can be read by the destination server 140.

Once generated, the agentless provisioner 200 can transmit an acknowledgment packet to the destination server 140 that includes a link to the TFTP server 220 containing the source file of the boot loader. The destination server 140 can call the agentless provisioner 200 over TFTP to fetch the boot loader code. This can be sourced from an internal Jar storage. The agentless provisioner 200 can then transmit, via the TFTP server 220, the source file and the boot loader configuration file to the destination server 140 as designated by the link to the TFTP server 220.

The agentless provisioner 200, via the bootloader, installs the operating system on the destination server 140. This is illustrated at step 340. In some embodiments, the bootloader installs the operating system via a bootstrapping process. As the bootloader is typically a low-level version of Linux, a more capable operating system is required to operate the server and run the application as specified in the deployment configuration 110. Additionally, the recovery partitions and other details are generally dictated by the requirements of the specified and intended operating system installation.

In some embodiments, performing the installation of the operating system includes the agentless provisioner 200 receiving a request, via loop back request, from the destination server 140 for files relating to the operating system. The agentless provisioner 200 can transmit the files, via the TFTP server 220, in chunks that allow the destination server 140 to load the information onto memory during the installation process. The files can include a full set of options for the application as well as call back links for additional files relating to the operating system and the application. These call back links can point to the kernel, kick start, auto-configuration files for the application, and any other pieces of data needed for the provisioning process. Additionally, included in the configuration files is a hard mapping of the first ethernet interface to the MAC address that was previously known to be talking to the DHCP server 210.

The agentless provisioner 200, via the server controllers, can then install the operating system on the destination server 140 from an auto boot file located within the files transmitted. In some embodiments, the destination server 140 loads a "comboot" from the agentless provisioner 200, via the TFTP server 220, and execute an auto boot from the previous operating system configuration. In some embodiments, the destination server 140 fetches the operating system kernel executable and an initial random-access memory (RAM) disk via the HTTPS server 230 through the REST API on the agentless provisioner 200. The kernel and disk can be sourced directly form inside the ISO file and served via the REST API dynamically so as to allow the destination server 140 to from memory.

During the installation process, the storage disk on the destination server 140 can be partitioned, and the installation of the operating system can be performed onto a partition. Additionally, the agentless provisioner 200 can monitor the installation of the operating system by the SSH service 250. As the installation is being performed, the main ISO file can be copied to a recovery partition which can be served over the REST API provided by the agentless provisioner 200. Once the main ISO file has been completely transferred onto the recovery partition, the agentless provisioner 200, via the DHCP server 210, can switch the destination server 140 from network boot to local boot.

The destination server 140 can be rebooted, and the remaining operating system installation can occur via the local ISO file located in the recovery partition. As this is occurring, the agentless provisioner can continue to monitor the progress of the installation via the out-of-band serial terminal on the destination server 140. Monitoring can include, for example, analyzing log files, real-time monitoring of the serial terminal output, regular expression ("regex") files, and the like. For example, the regex files can be parsed to look for specific points indicating a point in the installation process that requires actions. After installation of the operating system, the log files generated can be analyzed to ensure the installation was correctly performed.

The agentless provisioner 200 transmits an auto-configuration file 350 to the destination server 140. This is illustrated at step 350. The auto-configuration file can be downloaded via the REST API and placed on the local storage of the destination server 140, where it can be read. The destination server 140 can be rebooted, and the auto-configuration file can proceed with installing the application onto the server.

The agentless provisioner 200 monitors the installation of the application. This is illustrated at step 360. The agentless provisioner 200 can continue to monitor the destination server 140 via the out-of-band serial terminal. The output of the terminal can be parsed, and the agentless provisioner 200 can decide when it is necessary to act. The output can include the auto-install properties that are specific to the application being installed. For example, a vendor-specific error message can occur, which can be translated by the translation component 240. Based on the error message, the agentless provisioner 200 can take the necessary steps to correct the error. This can include, for example, retransmitting installation files, reverting to a previous step to ensure the destination server 140 is configured correctly, and the like.

Figure 4:
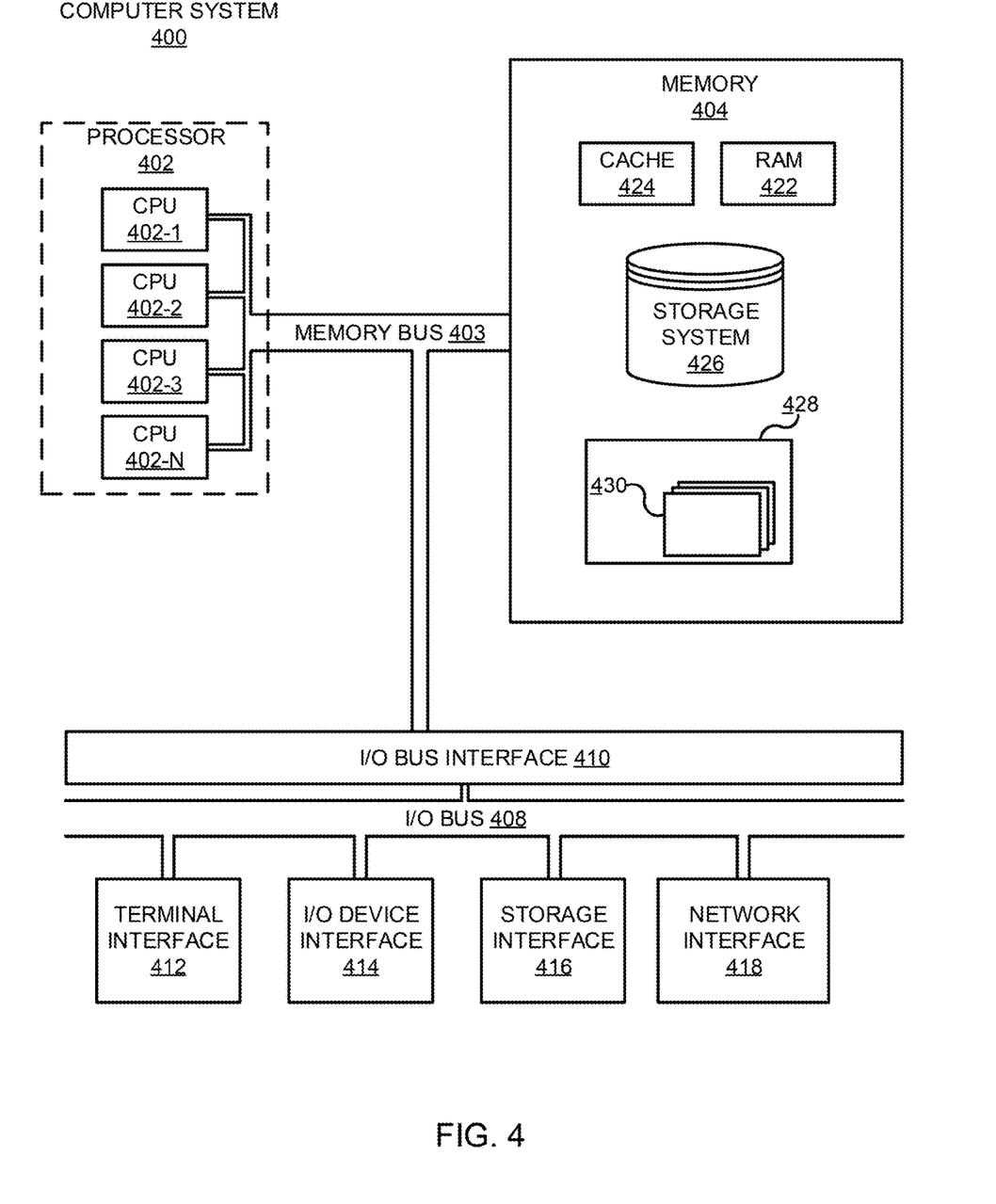
FIG. 4 is a high-level block diagram illustrating an example computer system that may be used in implementing one or more of the methods, tools, and modules, and any related functions, described herein in which the disclosure may be implemented.

Referring now to FIG. 4, shown is a high-level block diagram of an example computer system 400 (e.g., the agentless provisioner 200) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 400 may comprise one or more processors 402, a memory 404, a terminal interface 412, an I/O (Input/Output) device interface 414, a storage interface 416, and a network interface 418, all of which may be communicatively coupled, directly or indirectly, for inter-component communication via a memory bus 403, an I/O bus 408, and an I/O bus interface 410.

The computer system 400 may contain one or more general-purpose programmable central processing units (CPUs) 402-1, 402-2, 402-3, and 402-N, herein generically referred to as the processor 402. In some embodiments, the computer system 400 may contain multiple processors typical of a relatively large system; however, in other embodiments, the computer system 400 may alternatively be a single CPU system. Each processor 402 may execute instructions stored in the memory 404 and may include one or more levels of onboard cache.

The memory 404 may include computer system readable media in the form of volatile memory, such as random-access memory (RAM) 422 or cache memory 424. Computer system 400 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, the memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

Although the memory bus 403 is shown in FIG. 4 as a single bus structure providing a direct communication path among the processors 402, the memory 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 400 may, in some embodiments, contain multiple I/O bus interface units, multiple I/O buses, or both. Further, while multiple I/O interface units are shown, which separate the I/O bus 408 from various communications paths running to the various I/O devices, in other embodiments, some or all of the I/O devices may be connected directly to one or more system I/O buses.

In some embodiments, the computer system 400 may be a multi-user mainframe computer system, a single-user system, or a server computer or similar device that has little or no direct user interface but receives requests from other computer systems (clients). Further, in some embodiments, the computer system 400 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the major representative components of an exemplary computer system 400. In some embodiments, however, individual components may have greater or lesser complexity than as represented in FIG. 4, components other than or in addition to those shown in FIG. 4 may be present, and the number, type, and configuration of such components may vary.

One or more programs/utilities 428, each having at least one set of program modules 430 (e.g., the agentless provisioner 200), may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

It is to be understood that although this disclosure includes a detailed description on cloud computing, implementation of the teachings recited herein is not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and P.D.A.s).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Figure 5:
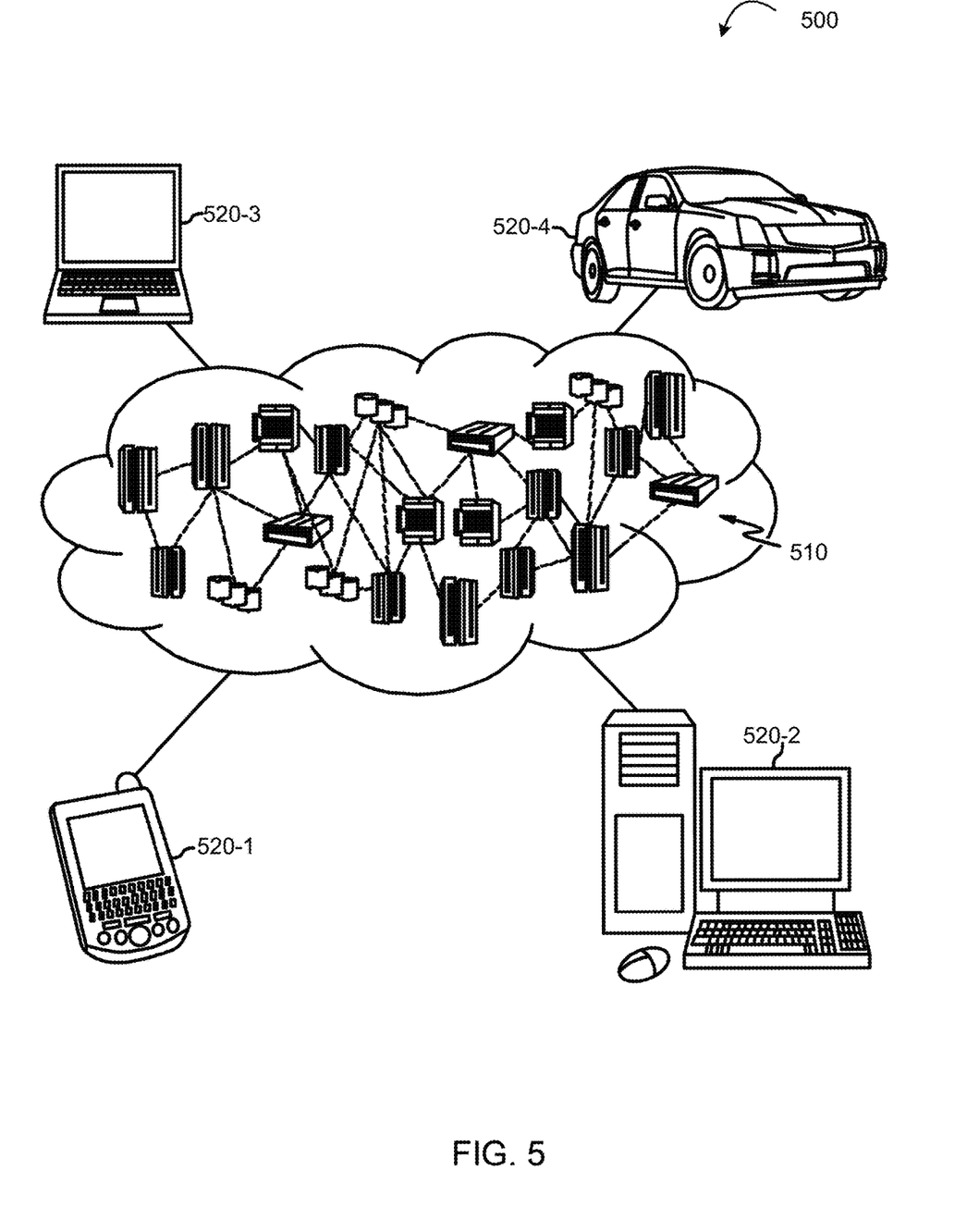
FIG. 5 depicts a cloud computing environment in accordance with embodiments of the present disclosure.

Referring now to FIG. 5, illustrative cloud computing environment 500 is depicted. As shown, cloud computing environment 500 includes one or more cloud computing nodes 510 with which local computing devices used by cloud consumers, such as, for example, personal digital assistant (P.D.A.) or cellular telephone 520-1, desktop computer 520-2, laptop computer 520-3, and/or automobile computer system 520-4 may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 520-1 to 520-4 shown in FIG. 5 are intended to be illustrative only and that computing nodes 510 and cloud computing environment 500 can communicate with any type of computerized device over any type of network and/or network addressable connection (e.g., using a web browser).

Figure 6:
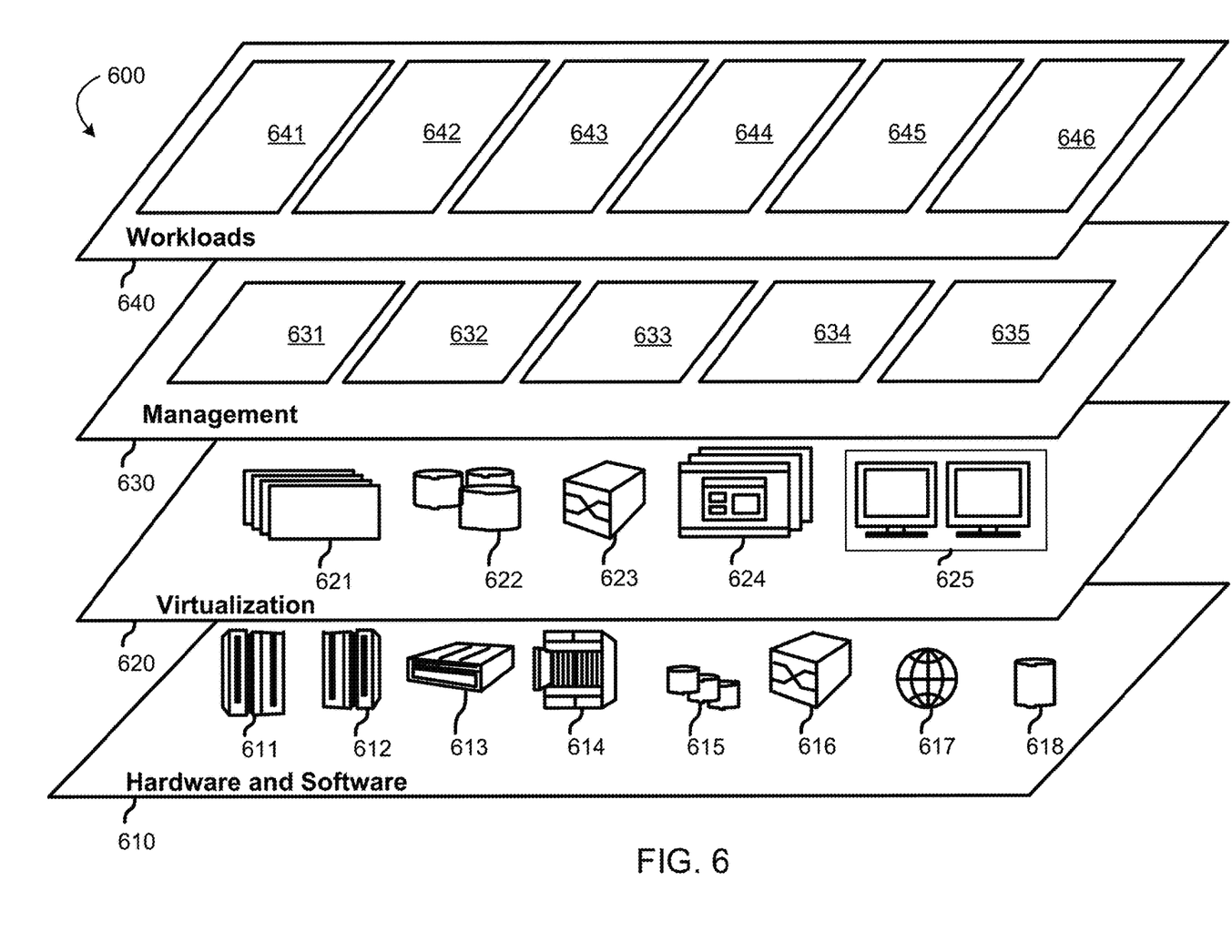
FIG. 6 depicts abstraction model layers in accordance with embodiments of the present disclosure.

Referring now to FIG. 6, a set of functional abstraction layers 600 provided by cloud computing environment 500 (FIG. 5) is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 610 includes hardware and software components. Examples of hardware components include mainframes 611; RISC (Reduced Instruction Set Computer) architecture-based servers 612; servers 613; blade servers 614; storage devices 615; and networks and networking components 616. In some embodiments, software components include network application server software 617 and database software 618.

Virtualization layer 620 provides an abstraction layer from which the following examples of virtual entities may be provided: virtual servers 621; virtual storage 622; virtual networks 623, including virtual private networks; virtual applications and operating systems 624; and virtual clients 625.

In one example, management layer 630 may provide the functions described below. Resource provisioning 631 provides dynamic procurement of computing resources and other resources that are utilized to perform tasks within the cloud computing environment. Metering and Pricing 632 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 633 provides access to the cloud computing environment for consumers and system administrators. Service level management 634 provides cloud computing resource allocation and management such that required service levels are met. Service Level Agreement (S.L.A.) planning and fulfillment 635 provide pre-arrangement for, and procurement of, cloud computing resources for which a future requirement is anticipated in accordance with an S.L.A.

Workloads layer 640 provides examples of functionality for which the cloud computing environment may be utilized. Examples of workloads and functions which may be provided from this layer include mapping and navigation 641; software development and lifecycle management 642 (e.g., the agentless provisioner 200); virtual classroom education delivery 643; data analytics processing 644; transaction processing 645; and precision cohort analytics 646.

The present disclosure may be a system, a method, and/or a computer program product at any possible technical detail level of integration. The computer program product may include a computer-readable storage medium (or media) having computer readable program instructions thereon for causing a processor to carry out aspects of the present disclosure.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But the various embodiments may be practiced without these specific details. In other instances, well-known circuits, structures, and techniques have not been shown in detail in order not to obscure embodiments.

When different reference numbers comprise, a common number followed by differing letters (e.g., 100a, 100b, 100c) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of server provisioning and deployment, the computer-implemented method comprising:

receiving, by a provisioner, a deployment configuration for a server, the deployment configuration includes a requested software build and a requested installation of an application and configuration for the server;
reconfiguring hardware on the server based on the deployment configuration and via an out-of-band management card on the server, wherein reconfiguring the hardware on the server comprises:
  configuring, via an out-of-band terminal, the server for preboot execution environment (PXE) booting on at least one available network interface card (NIC) on the server; and
  synchronizing a terminal speed on a serial terminal on the server;
pushing a boot loader on to the server including files for installation of an operating system and the application;
installing the operating system on the server via the boot loader;
  transmitting an auto configuration file to the server, wherein the auto configuration file provides installation properties relating to the application; and
monitoring a status of the server during the installation of the application using a serial terminal output on the server.

2. The computer-implemented method of claim 1, wherein reconfiguring the hardware on the server further comprises:
  rebooting the server to complete the configuration;
  receiving a dynamic host configuration protocol (DHCP) offer packet from the server; and
  providing the server with an internet protocol (IP) address and notating a media access control (MAC) address relating to the server.

3. The computer-implemented method of claim 1, wherein pushing the boot loader comprises:
  generating a boot loader configuration file, wherein the boot loader configuration file includes install options and a source software version for the boot loader based on the deployment configuration;
  transmitting an acknowledgment packet to the server including a link to a file transfer server containing a source file of the boot loader; and
  transmitting the source file and the boot loader configuration file to the server for installation via the link to the file transfer server.

4. The computer-implemented method of claim 1, wherein installing the operating system comprises:
  receiving a request from the server for files relating to the operating system;
  transmitting the files to the server, wherein the files include a full set of options for the application and call back links for additional files relating to the operating system;
  partitioning a storage disk on the server into at least a primary partition and a recovery partition;
  performing the installation of the operating system on the primary partition of the storage component;
  installing a recovery file on the recovery partition of the storage component;
  installing additional files on the server to allow the installation remaining to be performed offline via the recovery file; and
  analyzing information generated by the server to monitor the installation operating system.

5. The computer-implemented method of claim 1, wherein communication with the server is via a secure shell (SSH) tunnel.

6. The computer-implemented method of claim 1, wherein the provisioner is configured to translate vendor-specific commands provided by the server while configuring the server and installing the application.

7. The computer-implemented method of claim 1, wherein the provisioner is agentless.

8. The computer-implemented method of claim 1, wherein the provisioner scales based on a mapped universally unique identifier (UUID) relating to the server.

9. A computer program product including computer readable storage media for server provisioning and deployment, having computer executable instructions that when executed by at least one computer case the at least one computer to execute the instructions to:
  receive a deployment configuration for a server, the deployment configuration includes a requested software build and a requested installation of an application and configuration for the server;
  reconfigure hardware on the server based on the deployment configuration and via an out-of-band management card on the server, wherein reconfiguring the hardware on the server comprises instructions to:
    configure, via an out-of-band terminal, the server for preboot execution environment (PXE) booting on at least one available network interface card (NIC) on the server; and
    synchronize a terminal speed on a serial terminal on the server;
  push a boot loader on to the server including files for installation of an operating system and the application;
  install the operating system on the server via the boot loader;
    transmit an auto configuration file to the server, wherein the auto configuration file provides installation properties relating to the application; and
  monitor a status of the server during the installation of the application using a serial terminal output on the server.

10. The computer program product of claim 9, wherein reconfiguring the hardware on the server further comprises instructions to:
  reboot the server to complete the configuration;
  receive a dynamic host configuration protocol (DHCP) offer packet from the server; and
  provide the server with an internet protocol (IP) address and notating a media access control (MAC) address relating to the server.

11. The computer program product of claim 10, wherein pushing the boot loader comprises instructions to:
  generate a boot loader configuration file, wherein the boot loader configuration file includes install options and a source software version for the boot loader based on the deployment configuration;
  transmit an acknowledgment packet to the server including a link to a file transfer server containing a source file of the boot loader; and
  transmit the source file and the boot loader configuration file to the server for installation via the link to the file transfer server.

12. The computer program product of claim 10, wherein install of the operating system comprises instructions to:
  receive a request from the server for files relating to the operating system;
  transmit the files to the server, wherein the files include a full set of options for the application and call back links for additional files relating to the operating system;
  partition a storage disk on the server into at least a primary partition and a recovery partition;
  perform the installation of the operating system on the primary partition of the storage component;

install a recovery file on the recovery partition of the storage component;
install additional files on the server to allow the installation remaining to be performed offline via the recovery file; and
analyze information generated by the server to monitor the installation operating system.

13. The computer program product of claim 10, wherein communication with the server is via a secure shell (SSH) tunnel.

14. The computer program product of claim 10, wherein the provisioner is configured to translate vendor-specific commands provided by the server while configuring the server and installing the application.

15. The computer program product of claim 10, wherein the provisioner is agentless.

16. The computer program product of claim 10, wherein the provisioner scales based on a mapped universally unique identifier (UUID) relating to the server.

17. A system of threat similarity analysis for automated action on security alerts, the system comprising:
a memory;
a processor;
local data storage having stored thereon computer executable code, wherein the computer executable code includes the program instruction executable by a processor to cause the processor to perform a method comprising:
receiving a deployment configuration for a server, the deployment configuration includes a requested software build and a requested installation of an application and configuration for the server;
reconfiguring hardware on the server based on the deployment configuration and via an out-of-band management card on the server, wherein reconfiguring the hardware on the server comprises instructions to:
configure, via an out-of-band terminal, the server for preboot execution environment (PXE) booting on at least one available network interface card (NIC) on the server; and
synchronize a terminal speed on a serial terminal on the server;
pushing a boot loader on to the server including files for installation of an operating system and the application;
installing the operating system on the server via the boot loader;
transmitting an auto configuration file to the server, wherein the auto configuration file provides installation properties relating to the application; and
monitoring a status of the server during the installation of the application using a serial terminal output on the server.

18. The system of claim 17, wherein reconfiguring the hardware on the server further comprises:
rebooting the server to complete the configuration;
receiving a dynamic host configuration protocol (DHCP) offer packet from the server; and
providing the server with an internet protocol (IP) address and notating a media access control (MAC) address relating to the server.

19. The system of claim 17, wherein pushing the boot loader comprises:
generating a boot loader configuration file, wherein the boot loader configuration file includes install options and a source software version for the boot loader based on the deployment configuration;
transmitting an acknowledgment packet to the server including a link to a file transfer server containing a source file of the boot loader; and
transmitting the source file and the boot loader configuration file to the server for installation via the link to the file transfer server.

20. The system of claim 17, wherein installing the operating system comprises:
receiving a request from the server for files relating to the operating system;
transmitting the files to the server, wherein the files include a full set of options for the application and call back links for additional files relating to the operating system;
partitioning a storage disk on the server into at least a primary partition and a recovery partition;
performing the installation of the operating system on the primary partition of the storage component;
installing a recovery file on the recovery partition of the storage component;
installing additional files on the server to allow the installation remaining to be performed offline via the recovery file; and
analyzing information generated by the server to monitor the installation operating system.

* * * * *